United States Patent
Wu et al.

(10) Patent No.: US 8,173,284 B2
(45) Date of Patent: May 8, 2012

(54) HOUSING FOR A SEALED ELECTROCHEMICAL CELL

(75) Inventors: James X Wu, North Olmsted, OH (US); Richard A Langan, Parma, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 13/083,921

(22) Filed: Apr. 11, 2011

(65) Prior Publication Data

US 2011/0183164 A1    Jul. 28, 2011

Related U.S. Application Data

(60) Continuation of application No. 12/888,480, filed on Sep. 23, 2010, now Pat. No. 7,923,138, which is a division of application No. 12/121,977, filed on May 16, 2008, now Pat. No. 7,824,790, which is a continuation of application No. 10/833,549, filed on Apr. 28, 2004, now Pat. No. 7,687,189.

(51) Int. Cl.
   *H01M 2/12* (2006.01)
(52) U.S. Cl. ........................................................ 429/56
(58) Field of Classification Search .................. 429/53, 429/56–57
   See application file for complete search history.

(56) References Cited

U.S. PATENT DOCUMENTS

| | | |
|---|---|---|
| 3,279,953 A | 10/1966 | Bierdumphel |
| 3,852,117 A | 12/1974 | Fraioli |
| 4,345,611 A | 8/1982 | Ikeda et al. |
| 4,783,383 A | 11/1988 | Machida et al. |
| 4,855,195 A | 8/1989 | Georgopoulos et al. |
| 4,963,446 A | 10/1990 | Roels et al. |
| 5,015,542 A | 5/1991 | Chaney, Jr. et al. |
| 5,043,235 A | 8/1991 | Seefeldt et al. |
| 5,156,930 A | 10/1992 | Daio et al. |
| 5,418,084 A | 5/1995 | Georgopoulos |
| 5,462,820 A | 10/1995 | Tanaka |
| 5,532,075 A | 7/1996 | Alexandres et al. |
| 5,609,972 A | 3/1997 | Kaschmitter et al. |
| 5,677,076 A | 10/1997 | Sato et al. |
| 5,691,073 A | 11/1997 | Vu et al. |

(Continued)

FOREIGN PATENT DOCUMENTS

EP        0391720 A2     10/1990

(Continued)

OTHER PUBLICATIONS

Patent Cooperation Treaty (PCT), International Search Report and Written Opinion for Application No. PCT/US2007/013276, filed Jun. 6, 2007, mailed Nov. 30, 2007, European Patent Office, Netherlands.

*Primary Examiner* — Patrick Joseph Ryan
*Assistant Examiner* — Muhammad Siddiquee
(74) *Attorney, Agent, or Firm* — Robert C. Baraona

(57) ABSTRACT

An electrochemical cell with a collector assembly for sealing the open end of a cell container. The collector assembly includes a retainer and a contact spring with a peripheral flange, each having a central opening therein. A pressure release vent member disposed between the retainer and the peripheral flange of the contact spring seals the openings in the retainer and contact spring under normal conditions and ruptures to release pressure from within the cell when the internal pressure exceeds a predetermined limit.

5 Claims, 4 Drawing Sheets

U.S. PATENT DOCUMENTS

| | | | |
|---|---|---|---|
| 5,741,606 A | 4/1998 | Mayer et al. | |
| 5,747,187 A | 5/1998 | Byon | |
| 5,766,790 A | 6/1998 | Kameishi et al. | |
| 5,795,674 A * | 8/1998 | Shiota | 429/54 |
| 5,876,868 A | 3/1999 | Tanida | |
| 6,207,320 B1 * | 3/2001 | Song et al. | 429/171 |
| 6,265,097 B1 | 7/2001 | Konno et al. | |
| 6,303,246 B1 | 10/2001 | Takada et al. | |
| 6,444,348 B1 | 9/2002 | Saijo et al. | |
| 6,451,473 B1 | 9/2002 | Saito et al. | |
| 6,468,692 B1 | 10/2002 | Nemoto et al. | |
| 6,497,978 B1 | 12/2002 | Takada et al. | |
| 6,531,242 B1 | 3/2003 | Sugimoto et al. | |
| 6,610,437 B2 | 8/2003 | Tsurutani et al. | |
| 6,610,438 B2 | 8/2003 | Okumura et al. | |
| 6,620,544 B1 | 9/2003 | Shin et al. | |
| 6,777,128 B2 | 8/2004 | Kim | |
| 6,844,110 B2 | 1/2005 | Enomoto et al. | |
| 7,335,439 B2 | 2/2008 | Kawano et al. | |
| 7,368,203 B2 | 5/2008 | Iwanaga et al. | |
| 2003/0031919 A1 * | 2/2003 | Isozaki et al. | 429/56 |
| 2003/0087146 A1 | 5/2003 | Chi | |
| 2003/0118902 A1 | 6/2003 | Schubert et al. | |
| 2003/0170540 A1 * | 9/2003 | Ohzuku et al. | 429/231.1 |
| 2004/0072080 A1 | 4/2004 | Iwanaga et al. | |
| 2004/0121229 A1 | 6/2004 | Kim et al. | |
| 2004/0131940 A1 | 7/2004 | Suzuki et al. | |
| 2004/0241541 A1 | 12/2004 | Watanabe et al. | |
| 2005/0079404 A1 | 4/2005 | Schubert et al. | |
| 2005/0084752 A1 | 4/2005 | Kim | |
| 2005/0244706 A1 | 11/2005 | Wu et al. | |
| 2006/0115725 A1 | 6/2006 | Kim | |
| 2006/0222941 A1 | 10/2006 | Yamashita et al. | |
| 2006/0228620 A1 | 10/2006 | Martinson et al. | |
| 2007/0015046 A1 | 1/2007 | Kim et al. | |
| 2007/0141449 A1 | 6/2007 | Kim | |
| 2007/0154781 A1 | 7/2007 | Choi | |
| 2007/0202364 A1 | 8/2007 | Uh et al. | |
| 2008/0070109 A1 | 3/2008 | Oka | |

FOREIGN PATENT DOCUMENTS

| | | |
|---|---|---|
| EP | 0415378 A2 | 3/1991 |
| JP | 60148049 A | 8/1985 |
| JP | 06231743 A | 8/1994 |
| JP | 07094161 A | 4/1995 |
| JP | 08077995 A | 3/1996 |
| JP | 08138727 A | 5/1996 |
| JP | 09161753 A | 6/1997 |
| JP | 09213289 A | 8/1997 |
| JP | 09274900 A | 10/1997 |
| JP | 110868819 A | 3/1998 |
| JP | 10112300 A | 4/1998 |
| JP | 10223183 A | 8/1998 |
| JP | 10241645 A | 9/1998 |
| JP | 10275604 A | 10/1998 |
| JP | 10340714 A | 12/1998 |
| JP | 11102676 A | 4/1999 |
| JP | 11111255 A | 4/1999 |
| JP | 11224658 A | 8/1999 |
| JP | 11260334 A | 9/1999 |
| JP | 11283588 A | 10/1999 |
| JP | 2000077078 A | 3/2000 |
| JP | 2000260409 A | 9/2000 |
| JP | 2000277063 A | 10/2000 |
| JP | 2000277067 A | 10/2000 |
| JP | 2001266805 A | 9/2001 |
| JP | 2001332231 A | 11/2001 |
| JP | 2001351609 A | 12/2001 |
| JP | 2002008601 A | 1/2002 |
| JP | 2003303623 A | 10/2003 |
| JP | 2003324523 A | 11/2003 |
| JP | 2005071649 A | 3/2005 |
| JP | 2005093186 A | 4/2005 |
| JP | 2005123017 A | 5/2005 |
| JP | 2005259413 A | 9/2005 |
| JP | 2006216358 A | 8/2006 |
| JP | 2006221988 A | 8/2006 |
| JP | 2006252848 A | 9/2006 |
| JP | 2006278267 A | 10/2006 |
| JP | 2006286561 A | 10/2006 |
| JP | 2007027103 A | 2/2007 |
| JP | 2007141673 A | 6/2007 |
| JP | 2007157609 A | 6/2007 |
| JP | 2007194065 A | 8/2007 |
| JP | 2007207614 A | 8/2007 |
| KR | 20010061300 A | 7/2001 |
| KR | 20060010941 A | 2/2006 |

* cited by examiner

HOUSING FOR A SEALED ELECTROCHEMICAL CELL

CROSS-REFERENCE TO RELATED APPLICATION

This application is a continuation of U.S. Ser. No. 12/888,480, filed on Sep. 23, 2010, which is a Divisional of U.S. Ser. No. 12/121,977, filed on May 16, 2008, now U.S. Pat. No. 7,824,790, which is a continuation of U.S. Ser. No. 10/833,549, filed Apr. 28, 2004, now U.S. Pat. No. 7,687,189, all of which are fully incorporated herein by reference.

BACKGROUND

The present invention relates to an electrochemical battery cell having a housing that includes a container and a collector assembly for sealing the electrochemical battery cell.

Batteries used as power sources for electronic equipment can store large amounts of energy. Batteries can contain one or more electrochemical battery cells. Pressure inside the electrochemical battery cell can increase due to changes in internal temperature, an increase in internal volume of electrodes during discharge and gases generated during cell charging, in the case of rechargeable batteries, and discharge. Such electrochemical battery cells typically include a mechanism for releasing or discharging gas from the cell to limit the buildup of internal pressure.

Electrochemical battery cells can have an open-ended container and a collector assembly disposed at the open end of the container to close the electrochemical battery cell. The collector assembly can include a safety pressure release vent mechanism that releases excessive pressure.

Various collector assembly and pressure release vent designs have been used in electrochemical battery cells. For example, resealable pressure relief vents can be found in rechargeable aqueous electrolyte cells, such as nickel-cadmium and nickel-metal hydride cells. Primary (nonrechargeable) aqueous cells, such as alkaline zinc-manganese dioxide cells, have used collector assemblies with relatively large surface area plastic seals containing a weak section that can rupture when the internal pressure exceeds a predetermined limit. Primary and rechargeable nonaqueous electrolyte cells, such as cells with electrodes containing lithium metal and lithium intercalation materials, typically have collector assemblies with thin-walled plastic sealing members to minimize vapor transmission and pressure relief vents that are able to very quickly reduce internal pressure.

Examples of conventional collector assembly and pressure release vent designs can be found in: U.S. Pat. Nos. 4,963,446 (issued to Roels et al. Oct. 16, 1990), 5,015,542 (issued to Chaney, Jr. et al. May 14, 1991), U.S. Pat. Nos. 5,156,930 (issued to Daio et al. Oct. 20, 1992), 5,609,972 (issued to Kaschmitter et al. May 11, 1997), 5,677,076 (issued to Sato et al. Oct. 14, 1997), 5,741,606 (issued to Mayer et al. Apr. 21, 1998) and 5,766,790 (issued to Kameishi et al. Jun. 16, 1998). Each of these examples has a large collector assembly volume or dimensional constraints limiting the volume within the cell for active ingredients or a large number of components making the cell more costly and difficult to manufacture.

SUMMARY

The present invention relates to an electrochemical battery cell having an electrode assembly comprising positive and negative electrodes and a separator between the electrodes, an electrolyte and a housing. The housing includes a container and a collector assembly. The collector assembly has a pressure release vent member that is capable of rupturing when the internal pressure of the electrochemical battery cell reaches a predefined release pressure. The number and arrangement of components within the collector assembly requires a small volume, thereby allowing a large volume for active materials and facilitating manufacture of an economical and reliable cell.

In one embodiment of the present invention, the collector assembly includes a retainer and a contact spring, each of which defines an opening along a pressure release channel within the electrochemical battery cell. The collector assembly also includes a pressure release vent member disposed between the retainer and the contact spring and to close the pressure release channel. When the pressure within the electrochemical battery cell is at least as high as a predetermined release pressure, the pressure release vent member ruptures allowing matter within the cell to escape through the opening of the retainer.

In another embodiment of the invention the retainer and the contact spring peripheral flange cooperate with the pressure release vent member to form a seal between the pressure release vent member and the retainer. The retainer can apply a compressive force to the contact spring and the pressure release vent member, via a crimp in the retainer for example. In addition, the contact spring can further include a continuous projection within a peripheral flange of the contact spring to maintain a seal between the peripheral portion of the pressure release vent member and the retainer, even if the compressive force applied to the pressure release vent member is reduced. Furthermore, the pressure release vent member can be physically bonded to the electrically conductive retainer by hot melting, ultrasonic welding, or by the application of an adhesive.

In yet another embodiment the collector assembly comprises a sealing means between the pressure release vent member and the retainer.

The pressure release vent member can include at least one layer comprising a composition that is conductive or nonconductive. The pressure release vent member can include a composition of metal, polymer or mixtures thereof. The construction and composition of the pressure release vent member can be based on a vapor transmission rate of electrolyte that will provide a desirably low weight loss of the cell. The composition and thickness of the pressure release vent member can also be based on the predefined or desirable release pressure at which the pressure release member ruptures. In one example embodiment, a pressure release vent member that is a five-layer laminate of polyethylene teraphthalate/polyethylene/aluminum/polyethylene/low density polyethylene, and which has a thickness that ranges from about 0.0254 mm (0.001 inch) to about 0.254 mm (0.010 inch) has a release pressure that ranges from about 14.1 kg/cm$^2$ (200 lbs/in$^2$) to about 42.3 kg/cm$^2$ (600 lbs/in$^2$) at room temperature (20° C. to 25° C.).

BRIEF DESCRIPTION OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
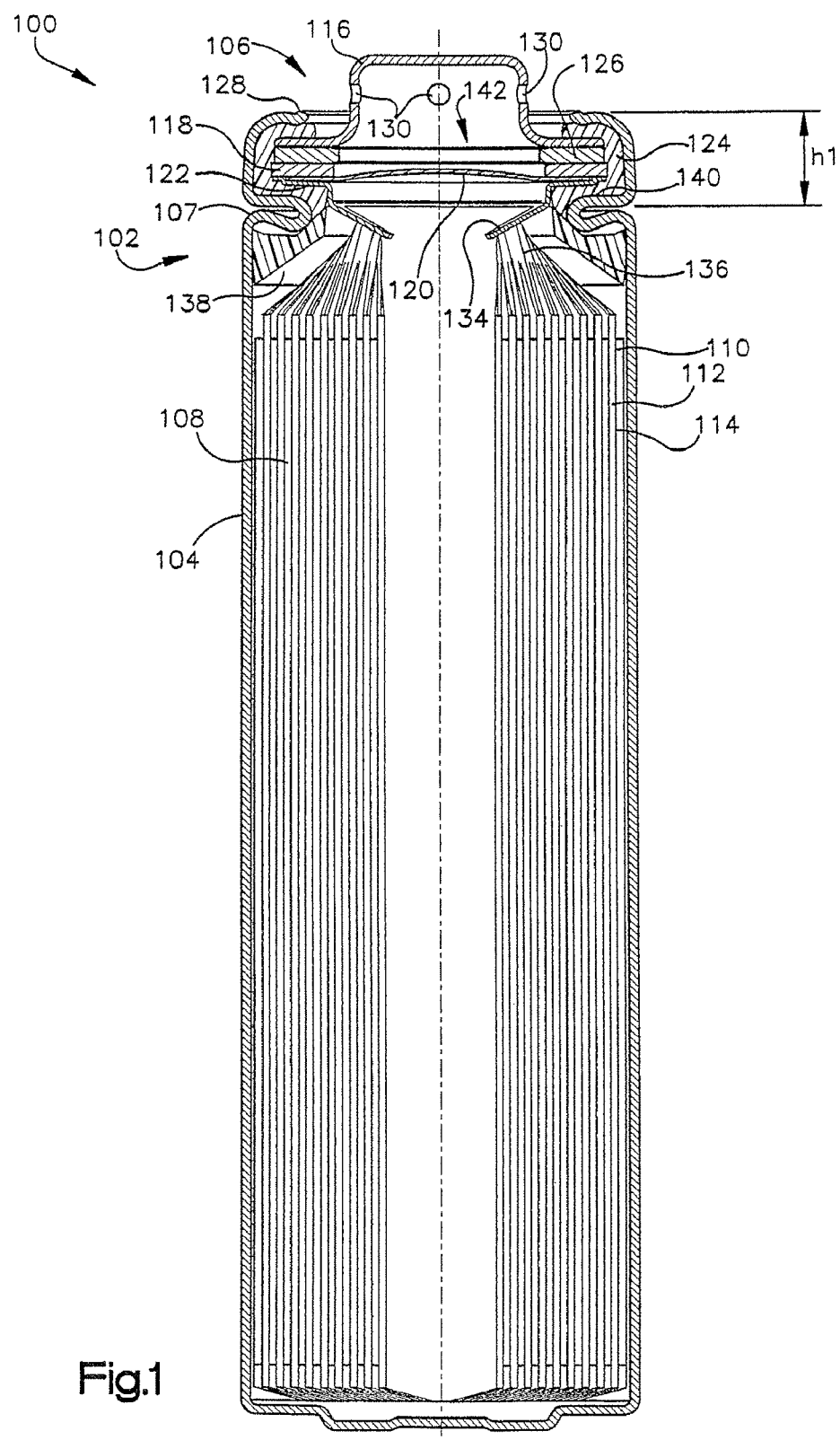
FIG. 1 is a cross-sectional view of an electrochemical battery cell according to an embodiment of the invention.

FIG. 1 shows a cylindrical electrochemical battery cell 100 according to an embodiment of the present invention. Electrochemical battery cell 100 of the present invention has a housing 102 that includes a container 104 and a collector assembly 106. The container 104 has a closed bottom and an open top end that is closed by the collector assembly 106. The container 104 also has a bead 107 that separates the top and bottom portions of the container 104. Disposed within the bottom portion of the container 104 is an electrode assembly 108 that includes a negative electrode or anode 110, a positive electrode or cathode 112, and a separator 114 disposed between the anode 110 and the cathode 112. In the example embodiment shown in FIG. 1, the anode 110, cathode 112 and separator 114 are each thin sheets which are wound together in a spiral, also known as a "jelly roll" design. Electrochemical battery cell 100 is cylindrical, however, one skilled in the art can appreciate that alternative embodiments of the present invention can also include cells and electrodes of other shapes. The container 104 can be one of several geometric shapes, for example, prismatic and rectangular.

If electrochemical battery cell is a lithium electrochemical battery cell, the anode 110 contains lithium metal, which can be in the form of a sheet or foil. A cathode 112 for a lithium cell can contain one or more active materials, usually in particulate form. Any suitable active cathode material may be used, and can include, for example, $FeS_2$, $MnO_2$, $CF_x$, and $(CF)_n$. Suitable separator materials are electrically non-conductive but are ion-permeable to electrolyte. Electrolytes that are used in a lithium electrochemical battery cell typically comprise organic solvents. Further detail regarding the material compositions used for the anode 110, cathode 112, separator 114 and electrolyte of lithium as well as various other electrochemical battery cells are described below.

The container 104 can be a metal can with an integral closed bottom, however, a metal tube that is initially open at both ends may also be used. The cell container 104 can be a steel that is optionally plated, for example, with nickel, on at least the outside to protect the outside of the container 104 from corrosion or to provide a desired appearance. Also, the type of steel can depend in part on the manner in which the container 104 is formed. For example, containers which are made using a drawing process can be made of a diffusion annealed, low carbon, aluminum killed, SAE 1006 or equivalent steel, with a grain size of ASTM 9 to 11 and equiaxed to slightly elongated grain shape. Other metals may be used to meet particular needs. For example, for an electrochemical battery cell 100 in which the container 104 is in electrical contact with the cathode 112, the open circuit voltage of the cell is about 3 volts or more, or the cell is rechargeable, a more corrosion-resistant container material than steel may be desired. Such materials include but are not limited to stainless steels, nickel plated stainless steels, nickel clad stainless steels, aluminum and alloys thereof.

The collector assembly 106 which is disposed in the top portion of the housing 102 can include a positive contact terminal 116, a retainer 118 which defines an opening, a pressure release vent member 120, a contact spring 122 which defines an opening, and a gasket 124 which is positioned between these components and the container 104. The collector assembly 106 can optionally include a positive temperature coefficient (PTC) device 126, which defines an opening, disposed between the retainer 118 and the positive contact terminal 116. The positive contact terminal 116 which protrudes above the container 104 is held in place by the inwardly crimped top edge 128 of the container 104 and the gasket 124.

The cathode 112 of the electrode assembly 108 is electrically connected to the collector assembly 106 by contact spring 122. The contact spring 122 can have at least one tab 134 that is biased against the upper edge of the current collector 136 which is disposed at the top of the electrode assembly 108. The current collector 136 is an electrically conductive substrate, for example a metal substrate, on which the cathode materials are disposed, that extends beyond the cathode materials and the separator 114. The current collector 136 may be made from copper, copper alloy, aluminum, aluminum alloy, and other metals as long as they are stable inside the cell. The current collector 136 can be in the form of a thin sheet, a foil, a screen or expanded metal. The contact spring 122 can be made of one or more conductive materials having spring-like characteristics, including for example, shape memory alloys. When the collector assembly 106 is placed into container 104 during assembly, the current collector 136 can push against the tab 134 of the contact spring 122, which has a composition that is resilient to force. This helps ensure contact between the tab 134 and the current collector 136. The contact spring 122 can have more than one tab 134 for contacting the current collector 136. In some embodiments electrical contact between the tab 134 and the current collector is maintained by the spring-like force applied by the tab 134 against the current collector 136. In other embodiments the tab 134 can be welded to the current collector 136. In yet other embodiments the tab 134 is connected to the current collector 136 with an electrically conductive lead, such as a narrow metal strip or wire welded to both the tab 134 and the current collector 136. Welded connections can sometimes be more reliable, especially under extreme handling, storage and use conditions, but pressure connections do not require additional assembly operations and equipment.

The anode 110 is electrically connected to the inner surface of the container 104 by a metal anode lead (not shown), and the electrode assembly 108 is otherwise physically separated from the container 104 by an outer wrap of the separator 114 and an insulator 138 which is located around the peripheral portion of the top of the electrode assembly 108 to prevent the current collector 136 from making contact with the container 104. Contact between the bottom edge of the cathode 112 and the bottom of the container 104 is prevented by the inward-folded extension of the separator 114 and an electrically insulating bottom disc (not shown) positioned in the bottom of the container 104.

During normal operation of the electrochemical battery cell 100, an electrical device (not shown) can make contact with the positive contact terminal 116 of the collector assembly 106 at one end, and the negative contact terminal at the closed end of container 104. A conductive path is thus established between the negative terminal or container 104, through the anode lead, through the electrode assembly 108, through the current collector 136, and to the collector assembly 106. The current path through the collector assembly 106 is through the tab 134 of the contact spring 122, across the retainer 118, around the pressure release vent member 120, and to the positive contact terminal 116. The retainer 118 can be made of one or more conductive materials, such as metal, bimetal, and tri-layer laminated materials. For example, the retainer 118 can be a metal such as nickel plated steel or stainless steel or a clad metal of combinations of steel, stainless steel, copper, aluminum, nickel and alloys thereof.

The positive contact terminal 116 should have good resistance to corrosion by water in the ambient environment as well as good electrical conductivity. Positive contact terminal 116 can be made from a conductive material, such as a nickel plated cold rolled steel or a steel that is nickel plated after the contact terminals are formed. The material used can also depend upon the complexity of the shape of the positive contact terminal 116. If the positive contact terminal 116 has a complex shape, then for example, a type 304 soft annealed stainless steel with ASTM 8 to 9 grain size may be used to provide the desired corrosion resistance in ease of metal forming. Once formed, the positive contact terminal 116 may also be plated with various metals, such as nickel.

The gasket 124 provides a seal for the collector assembly 106 against the top portion of container 104. The gasket 124 can extend from the insulator 138, which physically separates the current collector 136 from the lower portion of container 104 below the bead 107, to the edge 128 of the top portion of container 104. The contour of the top portion of the container 104 includes the bead 107 which provides a seating surface 140 for the collector assembly 106. Gasket 124 physically separates the conductive components of the collector assembly 106 from the top portion of the container 104 and also seals the peripheral edges of the components of the collector assembly 106 to prevent corrosion and leakage of electrolyte between these components. The gasket 124 is sized so that upon inserting of the collector assembly 106 into the container 104 and crimping the top edge 128 of the container 104 and gasket 124, the gasket 124 is compressed to create a seal between the gasket 124 and the container 104 as well as between the gasket 124 and interfacial surfaces of the other components of the collector assembly 106.

The gasket 124 can be made of a material composition that can form a compression seal and that also has a low vapor transmission rate (VTR) in order to minimize the entry of water into the cell and the loss of electrolyte from the electrochemical battery cell 100. Gasket 124 can be made of a polymeric composition, for example, a thermoplastic or thermoset polymer, the composition of which is based in part on the chemical compatibility of the anode 110, cathode 112 and electrolyte used in the electrochemical battery cell 100. Examples of materials that can be used in a gasket 124 for a non-aqueous cell, such as a lithium or lithium ion cell, include but are not limited to, polypropylene, polyphenylene sulfide, tetrafluoride-perfluoroalkyl vinyl ether co-polymer, polybutylene terephthalate (PBT), ethylene tetrafluoro-ethylene, polyphthalamide, and blends thereof. A suitable polypropylene that can be used is PRO-FAX® 6524 from Basell Polyolephins, of Wilmington, Del., USA. A suitable poly-phenylene sulfide is available as TECHTRON®. PPS from Boedeker Plastics, Inc. of Shiner, Tex., USA. The polymers can also contain reinforcing inorganic fillers and organic compounds in addition to the base resin.

A pressure release channel 142 of electrochemical battery cell 100 is defined by the opening of the retainer 118 and the opening of the contact spring 122. The closing of the electrochemical battery cell 100 and the pressure release channel 142 is completed by the pressure release vent member 120 disposed across the openings in the retainer 118 and the contact spring 122. A seal is formed between the peripheral portion of the pressure release vent member 120 and at least one of the retainer 118 and the contact spring 122. This seal can be a result of tight pressure contact at the interfacial surface(s), which can, in some embodiments, be enhanced by compression of the peripheral portion of the pressure release vent member 120. Optionally, an adhesive or sealant can be applied to the interfacial surface(s), as described below. The peripheral portion of at least one of the retainer 118 or the contact spring 122 can also serve to bias the peripheral portion of the pressure release vent member 120 against the sealing interfacial surface(s) as a result of axial forces placed on the gasket 124 and peripheral portions of the other components of the collector assembly 106 when the top edge of the container 104 and gasket 124 are crimped. The pressure release vent member biasing characteristics of the retainer 118 and the contact spring 122 can be achieved by using suitable materials and suitable geometric shapes along the peripheral flange of the contact spring 122 and the retainer 118 therefor.

During normal operation of electrochemical battery cell 100, gases are generated within the cell through chemical reactions. As the internal pressure builds within the electrochemical battery cell 100, the contents are substantially contained within the electrochemical battery cell 100 by the pressure release vent member 120. As the internal pressure builds the pressure release vent member 120 may deform; however, axial compressive force exerted by the container 104 on the collector assembly 106, as described above, can cause the pressure release vent member 120 remain substantially in place to prevent escape of the gases and cell contents through the opening of retainer 118. The compression of the collector assembly 106 within the electrochemical battery cell 100 can at least prevent the pressure release vent member 120 from creeping inwardly so far as to form an opening in the pressure release channel 142 between the opening of retainer 118 and the opening of contact spring 122 when the cell pressure is less than the predetermined release pressure.

However, when the pressure within the electrochemical battery cell 100 is at least as high as a predetermined release pressure, the pressure release vent member 120 ruptures and allows matter, in the form of gas or liquid or both, within the cell to escape through the opening of the retainer 118. The matter within the cell can escape through the one or more vent holes 130 in the positive contact terminal 116. The predetermined release pressure can vary according to the chemical type and the integrity of the electrochemical battery cell 100 in view of safety and environmental requirements. For example, in an AA size or AAA size lithium battery, the predetermined release pressure, i.e. the pressure at which the pressure release vent member 120 creates an opening, for example, via rupturing, can range from about 10.5 kg/cm$^2$ (150 lbs/in$^2$) to about 42.3 kg/cm$^2$ (600 lbs/in$^2$) and in some embodiments, from about 14.1 kg/cm$^2$ (200 lbs/in$^2$) to about 28.1 kg/cm$^2$ (400 lbs/in$^2$) at room temperature. The pressure at which the pressure release vent member ruptures can be determined by pressurizing a cell, e.g., through a hole punctured in the container.

As mentioned above, the electrochemical battery cell 100 can optionally include a PTC device 126 which defines an opening and is disposed between the retainer 118 and the positive contact terminal 116. During normal operation of the electrochemical battery cell 100, current flows through the PTC device 126. If the temperature of the electrochemical battery cell 100 reaches an abnormally high level, the electrical resistance of the PTC device 126 increases to reduces the current flow. The PTC device 126 can slow or prevent cell continued internal heating and pressure buildup resulting from electrical abuses such as external short circuiting, abnormal charging and forced deep discharging. However, if internal pressure continues to build to the predetermined release pressure, the pressure release vent member 120 ruptures to relieve the internal pressure.

The pressure release vent member 120 disposed between the retainer 118 and the contact spring 122, includes at least one layer of a composition of metal, polymer, or mixtures thereof. It is also possible that the pressure release vent member 120 can include two or more layers of different material compositions. For example, a second layer having a different composition than a first layer may be used for purposes of bonding the pressure release vent member 120 to the retainer 118 or to the contact spring 122. In another example, a second and a third layer having a different composition than the first layer, may be used to bond the pressure release vent member 120 to both the retainer 118 and the contact spring 122. Also, multiple layers having two or more compositions can be used for tailoring the performance properties, for example, strength and flexibility, of the pressure release vent member 120.

Compositions suitable for use in the pressure release vent member 120 can include, but are not limited to, metals such as aluminum, copper, nickel, stainless steel, and alloys thereof; and polymeric materials such as polyethylene, polypropylene, polybutylene terephthalate (PBT), polyethylene terephthalate (PET), ethylene acrylic acid, ethylene methacrylic acid, polyethylene methacrylic acid, and mixtures thereof. The composition of the pressure release vent member 120 can also include polymers reinforced with metal, as well as a single layer or a multi-layer laminate of metals or polymers or both. For example, the single layer can be a metal that is substantially impermeable to water, carbon dioxide and electrolyte, or a non-metallized film of a polymer coated with a layer of oxidized material that prevents vapor transmission, such as, for example, $SiO_x$ or $Al_2O_x$. The pressure release vent member 120 can furthermore contain an adhesive layer that contains, for example, polyurethane, and a heat sealable layer that contains, for example, low density polyolefins.

Alternatively, an adhesive or other type of sealant material can be applied to a portion of the pressure release vent member, the retainer or both for enhancing the seal within the collector assembly.

Regardless of the composition, the pressure release vent member 120 should be chemically resistant to the electrolyte contained in the cell 100 and should have a low vapor transmission rate (VTR) to provide a low rate of weight loss for the cell 100 over a broad range of ambient temperatures. For example, if the pressure release vent member 120 is metal which is impervious to vapor transmission, the VTR through the thickness of the pressure release member 120 is substantially zero. However, the pressure release vent member 120 can include at least one layer of vapor-permeable material, for example polymeric materials, as described above, that can function, for example, as an adhesive or as an elastomeric layer to achieve a seal between the pressure release vent member 120 and at least one of the retainer 118 and the contact spring 122.

The VTR measured at 75° C. of a layer of the pressure release vent member 120 according to example embodiments of the present invention can be less than about 11.81 g·mm/(day·mm$^2$) {3000 g·mil/(day·in$^2$)}, and in some embodiments can range from about 0.1969 g·mm/(day·mm$^2$) {50 g·mil/(day·in.sup$^2$)} to about 11.81 g·mm/(day·mm$^2$) {3000 g·mil/(day·in$^2$)}, in alternative embodiments, from about 0.3543 g·mm/(day·mm$^2$) {90 g·mil/(day·in$^2$)} to about 9.84 g·mm/(day·mm$^2$) {2500 g·mil/(day·in$^2$)}, and in yet alternative embodiments, from about 0.3543 g·mm/(day·mm$^2$) {90 g·mil/(day·in$^2$)} to about 5.9 g·mm/(day·mm$^2$) {1500 g·mil/(day·in$^2$)}. The VTR can vary according to the composition of the electrolyte contained in the electrochemical battery cell 100, in addition to the composition of a vapor-permeable layer of the pressure release vent member 120 which can be chosen such that the VTR is within the desired limits. Pressure release vent members having more than one layer of material and the test procedure for calculating the VTR are described in more detail below.

The predetermined release pressure, or the pressure at which the pressure release vent member 120 is intended to rupture, is a function of its physical properties (e.g., strength), its physical dimensions (e.g., thickness) and the area of the opening defined by the retainer 118 and the opening defined by the PTC device 126, whichever is smaller. The greater the exposed area of the pressure release vent member 120 by the retainer 118 and the PTC device 126, the lower will be the predetermined release pressure due to the greater collective force exerted by the internal gases of the electrochemical battery cell 100.

The thickness of the pressure release vent member 120 can be less than about 0.254 mm (0.010 inch), and in some embodiments can range from about 0.0254 mm (0.001 inch) to about 0.127 mm (0.005 inch), and in yet other embodiments the thickness can range from about 0.0254 mm (0.001 inch) to about 0.05 mm (0.002 inch). The composition and thickness of the pressure release vent member 120 can be determined by those of ordinary skill in the art, in view of the vapor transmission rate (VTR) and predetermined release pressure requirements.

Figure 2:
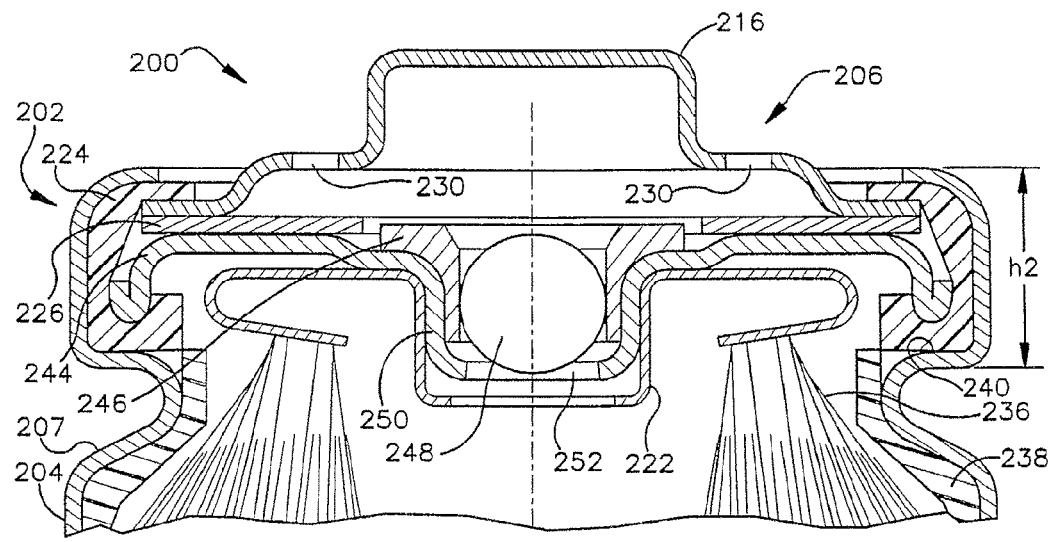
FIG. 2 is a cross-sectional view of the top portion of an electrochemical battery cell and collector assembly of the prior art.

FIG. 2 shows a cross-sectional view of the top portion of an electrochemical battery cell 200 of the prior art. The electrochemical battery cell 200 includes a housing 202 that includes a container 204 having a bead 207 that separates the top and bottom portions of the container 204, and an open end that is closed by collector assembly 206. Collector assembly 206 includes a positive contact terminal 216 having one or more vent holes 230, a gasket 224, a PTC device 226, a cell cover 244, a bushing 246, a vent ball 248, and a contact spring 222 that is in physical contact with the current collector 236 which extends from the electrode assembly (not shown) in the bottom portion of container 204. The current collector 236 is otherwise physically separated from the container 204 by an insulator 238. The cell cover 244 has a vent well 250 that projects downward away from the positive contact terminal 216 internal to the electrochemical battery cell 200. The vent well 250 has a vent aperture 252 formed therein which is sealed by the vent ball 248 and vent bushing 246 when they are seated in the vent well 250 such that the bushing 246 is compressed between the vent ball 248 and the vertical wall of the vent well 250. When the internal pressure of the electrochemical battery cell 200 exceeds a predetermined level, the vent ball 248, and in some cases both the bushing 246 and the vent ball 248, are forced away from the vent aperture 252 and at least partly out of the vent well 250 to release pressurized gas through the vent aperture 252 and vent holes 230 of electrochemical battery cell 200.

With reference to the example embodiment of the present invention shown in FIG. 1, the vertical height, h1, of the top portion, or shoulder, of container 104 of electrochemical battery cell 100, is less than the vertical height, h2, of the top portion of container 204 of electrochemical battery cell 200 in FIG. 2. The shoulder height, h1 (FIG. 1), measured outside the container 104 from the top of container 104 to the seating surface 140 of bead 107, is less than the shoulder height, h2

(FIG. 2), measured outside container 204, from the top of container 204 to the seating surface 240 of bead 207. The collector assembly 106 shown in FIG. 1 consumes less vertical height, or shoulder height, than the collector assembly 206 of the prior art of FIG. 2, thereby allowing for greater volume in the bottom portion of the container 104 in electrochemical battery cell 100 to accommodate active electrode materials. The pressure release vent member 120 (FIG. 1), being substantially flat, consumes less vertical space than the cell cover 244 having vent well 250 (FIG. 2). As a result, the top portion of a conventional AA size lithium/FeS$_2$ electrochemical battery cell 200 has a shoulder height h2 of about 3.175 mm (0.125 inch), whereas the top portion of AA size lithium/FeS$_2$ electrochemical 100 in an example embodiment of the present invention can have a shoulder height h1 of about 2.667 mm (0.105 inch) or less. In addition, the collector assembly 106 (FIG. 1) has fewer parts than the collector assembly 206 (FIG. 2) of the prior art, which allows for greater ease and flexibility in assembly and manufacturing, thereby reducing costs.

Figure 3:
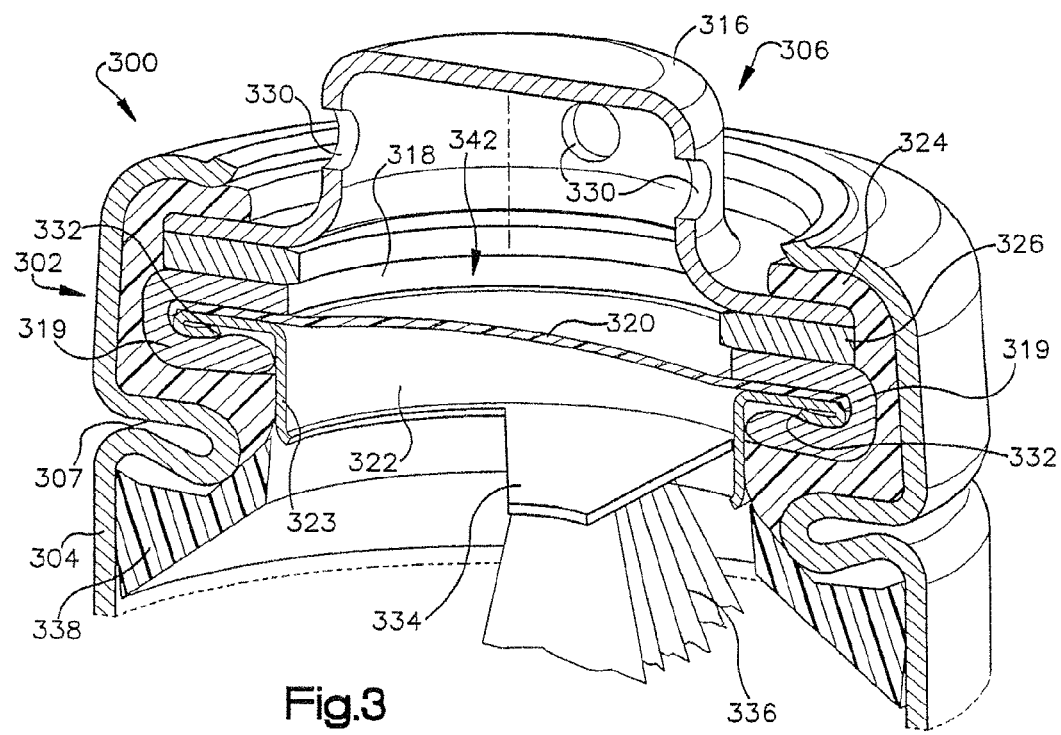
FIG. 3 is a cross-sectional view of the top portion of an electrochemical battery cell and collector assembly according to an embodiment of the invention.

FIG. 3 is a cross-sectional view of the top portion of an electrochemical battery cell 300 and the collector assembly 306 according to another example embodiment of the invention. The electrochemical battery cell 300 includes a housing 302 that includes a container 304 having a bead 307 between the top and bottom portions of the container 304, and an open end that is closed by collector assembly 306. Collector assembly 306 includes a positive contact terminal 316 having one or more vent holes 330, a gasket 324, a retainer 318 that defines an opening, a pressure release vent member 320, and a contact spring 322 which defines an opening and which has a tab 334 that is in physical contact with the current collector 336 which extends from the electrode assembly (not shown) in the bottom portion of container 304. The opening of retainer 318 and opening of contact spring 322 define an opening along pressure release channel 342, and the pressure release vent member 320 is disposed across the openings of retainer 318 and contact spring 322 to close the pressure release channel 342 between retainer 318 and contact spring 322. Optionally, the collector assembly 306 can include a PTC device 326 that defines an opening, disposed between the retainer 318 and the positive contact terminal 316.

The collector assembly 306 is similar to the collector assembly 106 of FIG. 1, however, the retainer 318 has a crimp 319, for example a C-shaped crimp, which directly contacts both the contact spring 322 and the pressure release vent member 320 and provides an axial force to hold the periphery of the pressure release vent member 320 against the retainer 318 and the contact spring 322. The crimp 319 of retainer 318 has high strength in both the radial and axial directions and can withstand high radial and axial compressive sealing force to retain the pressure release vent member 320 substantially in place when the internal pressure builds inside the electrochemical battery cell 300. When the pressure builds the pressure release vent member 320 may deform or bulge, but the compressive force can maintain a seal between the retainer 318 and the pressure release vent member 320 when the internal cell pressure is less than the predetermined release pressure.

In addition, contact spring 322 can include a peripheral flange that has a projection 332 that can improve the seal between the peripheral portion of the pressure release vent member 320 and the retainer 318. The peripheral flange of the contact spring 322 can be a continuous annular flange and the projection 332 can be a continuous projection completely surrounding the central opening in the spring 322. Alternatively, the projection 322 can be discontinuous, comprising a plurality of separate projections. The projection 332 has a shape that helps maintain a compressive force against the peripheral portion of the pressure release vent member 320 when the crimp 319 of the retainer 318 undergoes springback and stress relaxation and moves away from the contact spring 322. The projection 332 shown in the example embodiment of FIG. 3 is a downward and inward rolled edge of the peripheral flange of the contact spring 322; however, projections that project upward and that have alternative profiles are possible.

Contact spring 322 can also have an extending wall 323 that may exert a radial compressive force against the gasket 324. This can improve the effectiveness of sealing the open end of the container 304 by providing an additional internal seal between the contact spring 322 and the gasket 324. This can increase the length of the interfacial sealing surface between the gasket 324 and collector assembly 306 and keep electrolyte from the peripheral portion of the pressure release vent member 320. It can also shield the peripheral edge of the contact spring 322 and the bottom edge of the retainer 318 from electrolyte to prevent corrosion.

Alternatively, the retainer can be in the shape of a washer, as in cell 100 in FIG. 1, and the peripheral flange of the contact spring can include a portion that is crimped up and over a peripheral portion of the retainer.

Figure 4:
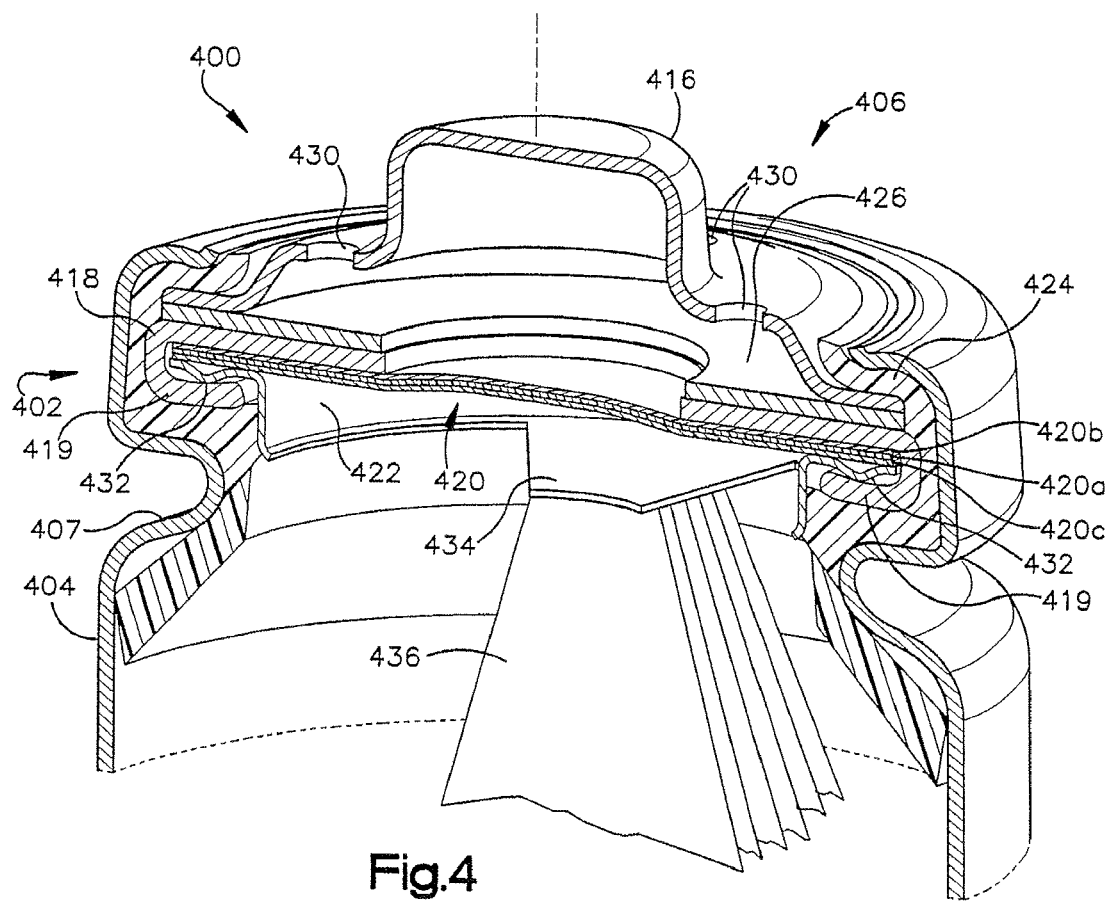
FIG. 4 is a cross-sectional view of the top portion of an electrochemical battery cell and collector assembly according to an embodiment of the invention.

FIG. 4 illustrates electrochemical battery cell 400 according to an alternative embodiment of the present invention. Electrochemical battery cell 400 includes a housing 402 that includes a container 404 having a bead 407 that separates the top and bottom portions of the container 404, and an open end that is closed by collector assembly 406. Collector assembly 406 includes a positive contact terminal 416 having one or more vent holes 430, a gasket 424, a retainer 418 having an opening, a pressure release vent member 420, and a contact spring 422 having a tab 434 that is in physical contact with the current collector 436 which extends from the electrode assembly (not shown) in the bottom portion of container 404. Optionally, the collector assembly 406 can include a PTC device 426 disposed between the retainer 418 and the positive contact terminal 416.

As in the retainer 318 of electrochemical battery cell 300 (FIG. 3), the retainer 418 of electrochemical battery cell 400 (FIG. 4) has a crimp 419, for example a C-shaped crimp, that contacts the pressure release vent member 420 and contact spring 422. The retainer 418, the contact spring 422, and the pressure release vent member 420 cooperate to form an electrolyte seal within the collector assembly 406. Contact spring 422 has a peripheral flange with a projection 432 in the form of a downward projecting annular groove with a V-shaped profile, although alternative geometries and profiles of the projection 432 are possible. The peripheral flange of contact spring 422 can be a continuous (e.g., annular) flange, and the projection 432 can be continuous (e.g., an annular projection) along the peripheral flange of contact spring 422.

As described above, the predefined release pressure of the electrochemical battery cell 400, which is the pressure at which the pressure release vent member 420 ruptures, can be controlled by varying the size of the opening of retainer 418. For a given material type and thickness, the release pressure of the electrochemical battery cell can be decreased by increasing the opening defined by retainer 418, assuming the pressure release vent member 420 has the same thickness and composition, because more outward force will be exerted on the pressure release vent member 420. For example, the opening defined by retainer 418 is smaller than the opening defined by retainer 318 (FIG. 3), and therefore, the predefined release pressure of electrochemical battery cell 400 is greater than the predefined release pressure of electrochemical battery, cell 300 (FIG. 3). The above also assumes that the opening of the PTC device 426 is at least as large as the opening defined by the retainer 418.

In an alternative embodiment, the electrochemical battery cell 400 (FIG. 4) can have a collector assembly 406 that can include an optional internal gasket in addition to gasket 424. The internal gasket is disposed between the pressure release vent member 420 and at least one of the retainer 418 and contact spring 422 to provide an electrolyte seal. The internal gasket can improve the effectiveness of sealing the pressure release vent member 420 against the surrounding metal components when the collector assembly 406 is placed into the container 404. The internal gasket can be made of one of several materials, for example elastomeric materials, described above with regards to gasket 124 (FIG. 1), and it can be an adhesive-coated material to provide an adhesive bonded seal. The internal gasket can have a C-shaped profile disposed between the retainer 418 and both the contact spring 422 and the pressure release vent member 420, but the internal gasket can have a variety of shapes. For example, the internal gasket can be a substantially flat washer disposed between the retainer 418 and the upper surface of the peripheral portion of the pressure release vent member 420, between the pressure release vent member 420 and the upper surface of the peripheral portion of the contact spring 422, or in both of these locations. The internal gasket can also be L-shaped, oriented in an upright or inverted position, such that a vertical wall of the internal gasket is disposed around the outer edges of the peripheral portions of the pressure release vent member 420 and the contact spring 422, as long as there is an electrical contact between the contact spring 422 and the retainer 418. Such an L-shaped configuration, as well as the C-shaped geometry, can seal electrolyte from the peripheral portion of the pressure release vent member 420. Similar internal gaskets can be included in alternative embodiments of electrochemical battery cells 100, 300, illustrated in FIGS. 1 and 3, respectively, as well as in other embodiments.

In cell 400 the pressure release vent member 420 includes a first layer 420a, a second layer 420b and a third layer 420c. For example, the second layer 420b, which is disposed between the first layer 420a and the retainer 418, and the third layer 420c, which is disposed between the first layer 420a and the contact spring 422, can function as an adhesive or a sealable layer to seal the pressure release vent member 420 against the retainer 418 and contact spring 422. As in any of the example embodiments the pressure release vent member 420 can be bonded to the retainer 418 or the contact spring 422, or both, by one several methods, for example, adhesive bonding, spot welding, ultrasonic welding or other welding and attachment methods known by those skilled in the art. It is also possible that the pressure release vent member 420 can be held in place mechanically such that layers of adhesives and heat sealable materials are not needed. The second layer 420b and the third layer 420c can also function as a protective coating to prevent marring or rupture of the first layer 420a during assembly.

As described above with respect to electrochemical battery cell 100 (FIG. 1), the pressure release vent member 120 (FIGS. 1, 3) and 420 (FIG. 4) can include at least one layer of a composition containing metal, polymer, and mixtures thereof. A suitable three-layer laminate that can be used for the pressure release vent member 420 is PET/aluminum/EAA copolymer available as LIQUIFLEX® Grade 05396 35C-501C from Curwood of Oshkosh, Wis., USA. A suitable five-layer laminate is PET/PE/Aluminum/PE/LLDPE available as BF-48 from Ludlow Coated Products of Columbus, Ga., USA, which is a wholly-owned subsidiary Tyco International, Ltd. of Princeton, N.J., USA.

Figure 5:
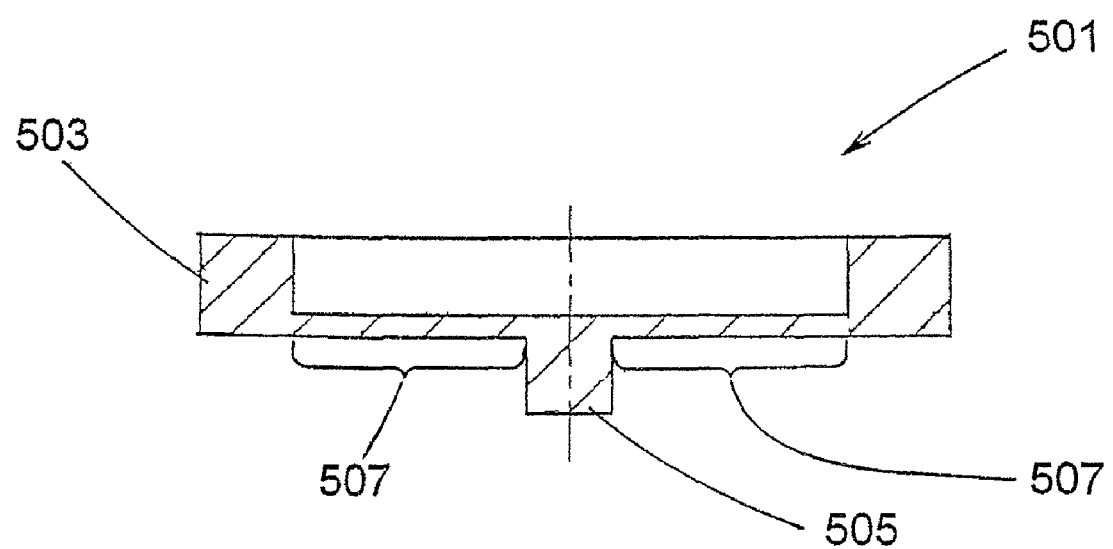
FIG. 5 is a cross-sectional view of a test membrane used in a Vapor Transmission Rate test.

The VTR ranges of any permeable layer of the pressure release vent member 120 (FIG. 1), 320 (FIG. 3), and 420 (FIG. 4) as described above can be determined using a method adapted from ASTM E96-80 (Standard Test Method for Water Vapor Transmission of Materials). A test membrane 501 (FIG. 5) having a composition of a permeable layer of the pressure release vent member, for example pressure release vent members 120, 320, 420, is placed over the top of a 15 ml bottle (e.g., Wheaton Serum Bottle, 25 mm diameter.times.54 mm high, Cat. No. 06-406D) that is 25 mm diameter by 54 mm high and contains 8 ml of the electrolyte to be used in a cell. The vent membrane 501 has a wall 503, a hub 505 and a test surface 507 sized to provide a seal against the bottle. The outer diameter of wall 503 is 19.56 mm and the inner diameter of wall 503 is 14.33. The hub 505 has a diameter of 3.23 mm and a length below the test surface 507 of 1.91 mm. The test surface 507 has a thickness of 0.508 mm and a test surface area, which is the annular area between wall 503 and hub 505, of 1.529 $cm^2$. Vacuum grease is applied to the lip of the bottle, and a seal (e.g., Wheaton Aluminum Seal Cat. No. 060405-15) having a 15.88 mm diameter center hole is placed over the test membrane and crimped tightly onto the bottle such that the test membrane 501 will remain sealed to the bottle during the test. The sealed bottle is weighed and the bottle is stored at 75° C. and weighed at regular intervals within a predetermined test period (e.g. monthly for six months, daily for two weeks, etc.). The change in weight is determined over the test period and the first experimental VTR is calculated. The same test is performed on a sealed empty bottle as described above and the change in weight is determined over the same regular intervals and test period, and the second experimental VTR is calculated. Each of the first and second experimental VTR is calculated using the average total weight loss. Finally, the second experimental VTR calculated for the test run on the empty bottle is subtracted from the first experimental VTR calculated for the test run on the bottle containing electrolyte to obtain the VTR of the test membrane.

Materials that can be used for the electrode assembly and the electrolyte in the embodiments of the present invention, including but not limited to the example embodiments described above in FIGS. 1, 3, and 4, are described as follows. The anode in a lithium electrochemical battery cell contains lithium metal, often in the form of a sheet or foil. The composition of the lithium can vary, though the purity is always high. The lithium could be alloyed with other metals such as aluminum, to provide the desired cell electrical performance. The anode for a lithium ion cell includes one or more lithium-intercalable materials. By intercalable materials it is meant that the material is capable of insertion and de-insertion of lithium ions into their crystalline structure. Examples of suitable materials include, but are not limited to, carbons such as graphitic, mesophase and/or amorphic carbons; transition metal oxides such as nickel, cobalt and manganese; transition metal sulfides, for example, those of iron, molybdenum, copper and titanium; and amorphous metal oxide, for example those containing silicone and tin. These materials are generally particulate materials that are formed into the desired shape.

A cathode for a lithium cell contains one or more active materials, usually in particulate form. Any suitable active cathode material may be used, and can include for example $FeS_2$, $MnO_2$, CF, and $(CF)_n$. A cathode for a lithium ion cell contains one or more lithium-intercalated or lithium-intercalable materials, usually in particulate form. Examples include metal oxides, such as vanadium and tungsten; lithiated transition metal oxides, for example, nickel, cobalt and manganese; lithiated metal sulfides for example those of iron, molybdenum, copper and titanium; and lithiated carbons.

Suitable separator materials are ion-permeable and electrically non-conductive. Examples of suitable separators include microporous membranes made from materials such as polypropylene, polyethylene and ultra high molecular weight polyethylene. A suitable separator material for Li/FeS$_2$ cells is available as CELGARD® 2400 microporous polypropylene membrane from Celgard Inc., of Charlotte, N.C., USA, and Setella F20DHI microporous polyethylene membrane available from Exxon Mobil Chemical Company of Macedonia, N.Y., USA. A layer of a solid electrolyte or a polymer electrolyte can also be used as a separator.

Electrolytes for lithium and lithium ion cells are non-aqueous electrolytes and contain water only in very small quantities, for example, less than about 500 parts per million by weight, as a contaminant. Suitable non-aqueous electrolytes contain one or more electrolyte salts dissolved in an organic solvent. Any suitable salt may be used depending on the anode and cathode active materials and the desired cell performance. Examples include lithium bromide, lithium perchlorate, lithium hexafluorophosphate, potassium hexafluorophosphate, lithium hexafluoroarsonate, lithium trifluoromethanesulfonate and lithium iodide. Suitable organic solvents include one or more of the following: dimethyl carbonate; diethyl carbonate; dipropyl carbonate; methylethyl carbonate; ethylene carbonate; propylene carbonate; 1,2-butylene carbonate; 2,3-butylene carbonate; methaformate; gamma-butyrolactone; sulfolane; acetonitrile; 3,5-dimethylisoxazole; n,n-dimethylformamide; and ethers. The salt and solvent combination should provide sufficient electrolytic and electrical conductivity to meet the cell discharge requirements over the desired temperature range. When ethers are used in the solvent they provide generally low viscosity, good wetting capability, good low temperature discharge performance and high rate discharge performance. Suitable ethers include, but are not limited to, acyclic ethers such as 1,2-dimethoxyethane (DME); 1,2-diethoxyethane; di(methoxyethyl)ether; triglyme, tetraglyme and diethylether; cyclic ethers such as 1,3-dioxolane (DIOX), tetrahydrofliran, 2-methyl-tetrahydrofuran and 3-methyl-2-oxazolidinone; and mixtures thereof.

Electrochemical battery cells according to the invention can be of a type other than lithium and lithium ion cells. Examples include both primary and rechargeable cells with aqueous electrolytes, such as zinc/MnO$_2$, zinc/NiOOH, nickel/cadmium and nickel/metal hydride alkaline cells. These types of cells can have alkaline electrolytes with solutes such as potassium hydroxide, sodium hydroxide and mixtures thereof.

The electrochemical battery cells 100, 300 and 400 can be assembled by any suitable process. For example, the electrochemical battery cell 100 of FIG. 1 can be made by inserting the electrode assembly 108 and the insulator 138 into the cell container 104 and then dispensing electrolyte into the container 104. The gasket 124, the contact spring 122, the retainer 118, the pressure release vent member 120, and, optionally, the PTC device 126 are then placed in the open end of the container 104. The container 104 is supported at the bead 107 while the collector assembly 106 including gasket 124 and positive contact terminal 116 are pushed downward against the seating portion 140 of the bead 107 and the top edge of the container 104 is bent inward so that the container 104 is compressed against gasket 124 to complete the sealing of the open end of the housing. Any suitable method may be used to seal the electrochemical battery cell 100, such as deforming the container 104 by crimping, colleting, swaging, or redrawing.

In an alternative embodiment, the pressure release vent 120 can be bonded to the retainer 118 by one or more several methods, such as by hot melting, ultrasonic welding, or by the application of an adhesive. As described above, the pressure release vent member 120 can be a single layer, or alternatively, a laminate of two or more layers of materials. In such case, the pressure release vent member 120 can be bonded to the retainer 118 to form a subassembly that is then inserted into the container 104 following the gasket 124 and the contact spring 122. The PTC device 126 and the positive contact terminal 116 are then placed in the open end of the container 104 to seal the electrochemical battery cell 100. Alternatively, the pressure release vent 120 can be bonded to both the contact spring 122 and the retainer 118 by one of the methods described above.

The example embodiment of electrochemical battery cell 300 (FIG. 3) includes a crimped retainer 318 that is formed by placing the pressure release vent member 320 onto the retainer 318, placing the contact spring 322 onto the pressure release vent member 320, and then bending the edge of the retainer 318 so that it contacts the contact spring 310 to form a subassembly. The pressure release vent member 320 can be optionally bonded to the retainer 318 or to the contact spring 322 or both the retainer and the contact spring. A similar subassembly can be formed for use in electrochemical battery cell 400 (FIG. 4). Where the contact springs 322 and 422 include projections 332 and 432, respectively, the peripheral flanges of the contact springs 322 and 422 are shaped to form one of many possible geometries, such as an annulus or polygon, with one of many possible profiles, such as a V-groove or rounded edge, before the contact springs are used to form the subassemblies.

Although the foregoing invention has been described in some detail for purposes of clarity of understanding, it will be apparent that certain changes and modifications may be practiced within the scope of the appended claims. For example, although the specification has described primarily lithium and lithium ion cells, the invention can also apply to other cell types. Also, while the embodiments described above have illustrated a pressure release vent member associated with a positive contact terminal that is connected to a cathode on discharge, the same release mechanism could be employed at a negative cell terminal. Therefore, the present embodiments are to be considered as illustrative and not restrictive, and the invention is not to be limited to the details given herein, but may be modified, and is limited only by the scope of the appended claims.

What is claimed is:

1. An electrochemical cell, comprising:
a cylindrical container having: a closed bottom, an open top end and a bead that separates top and bottom portions of the container;
a spirally wound electrode assembly disposed in the bottom portion of the container with an electrolyte, the spirally wound electrode assembly including a negative electrode consisting essentially of lithium or a lithium alloy, a positive electrode including particulate iron disulfide, and a separator disposed between the positive and negative electrodes;
a collector assembly seated on the bead so that, when an outermost edge of the top end is crimped around the collector assembly, the container is axially sealed;
wherein the collector assembly includes an insulating gasket, a terminal cover, a PTC member, a conductive member defining a vent release channel, a vent member, a retainer and a contact tab forming a direct electrical connection between the electrode assembly and the collector assembly;

wherein the terminal cover is seated on a top-facing portion of the PTC member; and wherein the retainer is coupled to the vent member, disposed beneath a bottom-facing portion of the PTC member and crimped around the conductive member.

2. The electrochemical cell according to claim 1, wherein the vent member is bonded to the retainer.

3. The electrochemical cell according to claim 1, wherein the electrolyte includes less than 500 ppm of water.

4. The electrochemical cell according to claim 1, wherein the vent member comprises a layer of aluminum.

5. The electrochemical cell according to claim 1, wherein the conductive member is welded to the contact tab.

* * * * *